US010350693B1

(12) United States Patent
Coffelt

(10) Patent No.: US 10,350,693 B1
(45) Date of Patent: Jul. 16, 2019

(54) CIRCLE CUTTING SYSTEM

(71) Applicant: Everett Lawrence Coffelt, Springerville, AZ (US)

(72) Inventor: Everett Lawrence Coffelt, Springerville, AZ (US)

( * ) Notice: Subject to any disclaimer, the term of this patent is extended or adjusted under 35 U.S.C. 154(b) by 84 days.

(21) Appl. No.: 15/423,393

(22) Filed: Feb. 2, 2017

Related U.S. Application Data

(60) Provisional application No. 62/290,581, filed on Feb. 3, 2016.

(51) Int. Cl.
*B23K 7/00* (2006.01)
*B23K 7/10* (2006.01)

(52) U.S. Cl.
CPC .............. *B23K 7/107* (2013.01); *B23K 7/002* (2013.01)

(58) Field of Classification Search
CPC ...................................................... B23K 7/107
See application file for complete search history.

(56) References Cited

U.S. PATENT DOCUMENTS

| | | |
|---|---|---|
| 1,351,846 A | 9/1920 | Forster |
| 2,296,480 A * | 9/1942 | Nicolai .................. B23K 7/107 266/70 |
| 2,743,101 A | 4/1956 | Clark |
| 3,804,391 A | 4/1974 | Case et al. |
| 4,157,814 A | 6/1979 | Miller |
| 4,621,792 A * | 11/1986 | Thurston ................ B23K 7/107 266/70 |
| 5,360,201 A * | 11/1994 | Balentine ............... B23K 7/107 266/48 |
| 5,511,765 A | 4/1996 | Shippen |
| 2008/0308190 A1 | 12/2008 | Brunson |

* cited by examiner

*Primary Examiner* — Scott R Kastler
(74) *Attorney, Agent, or Firm* — Plager Schack LLP; Mark H. Plager; Michael J. O'Brien

(57) ABSTRACT

An attachment to fit to a nozzle portion of an oxy-fuel torch that enables an operator to precisely cut a circle in a metal without having to move during operation is disclosed. The attachment includes a nut threadably attached to the nozzle portion that in turn holds a brass bushing that is concentrically and coaxially arranged inside a bearing within a bearing retainer. Further, a torch radius adjustment arm retainer is slidably locked to the bearing retainer via a dovetail joint and is configured to slidably receive a long arm of an L-shaped radius adjustment, further secured by a first thumb screw. The operator cuts the circle having a radius equal to distance between the nozzle portion and a replaceable radius pivot point threadably attached at end of a short arm of the radius adjustment arm by pivoting on said pivot point and rotating the torch in the circle.

12 Claims, 4 Drawing Sheets

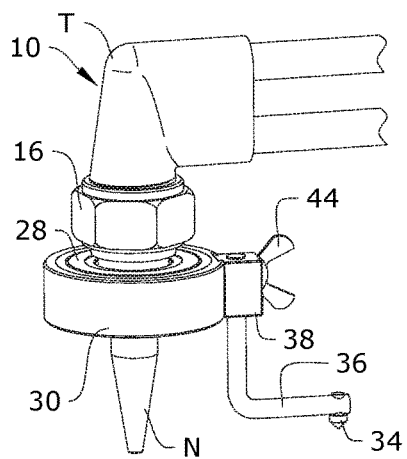
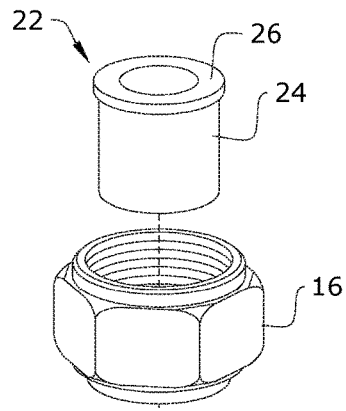
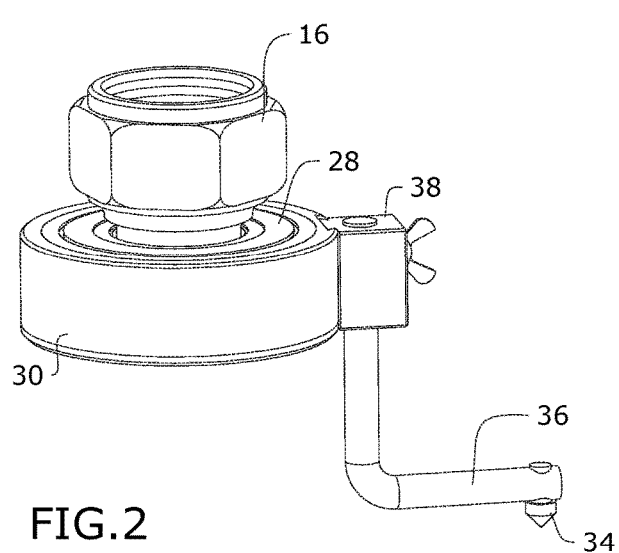
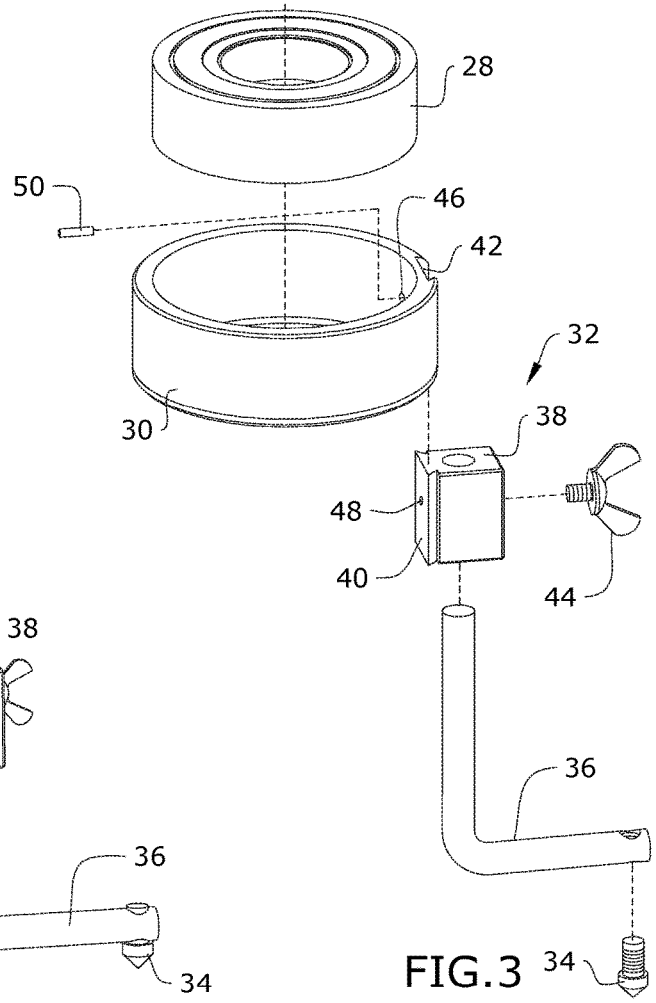
FIG.1
FIG.2
FIG.3

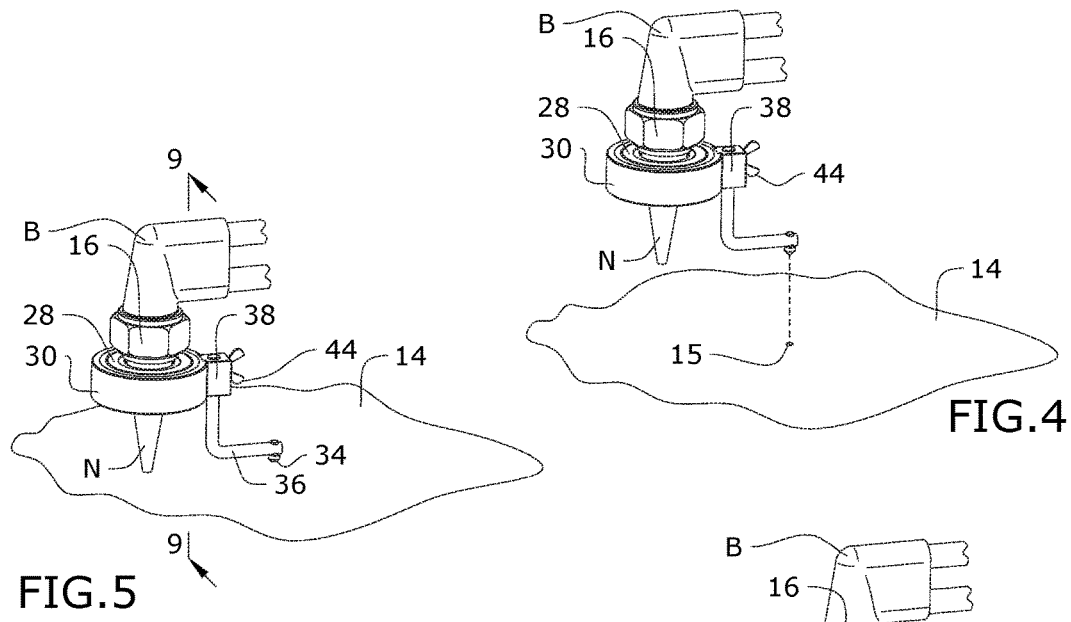
FIG.5
FIG.4
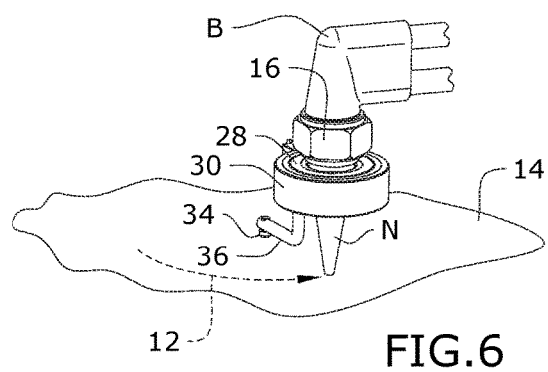
FIG.6
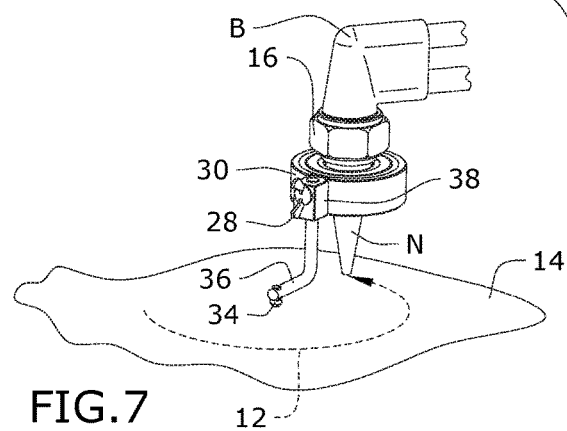
FIG.7
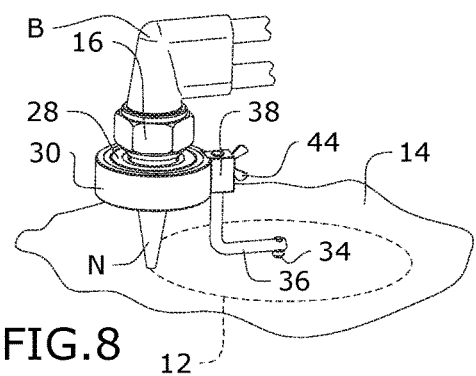
FIG.8

CIRCLE CUTTING SYSTEM

RELATED APPLICATION

This application claims priority to provisional patent application U.S. Ser. No. 62/290,581 filed on Feb. 3, 2016, the entire contents of which is herein incorporated by reference.

BACKGROUND

The embodiments herein relate generally to an attachment for an oxy-fuel torch in order to enable the torch for precisely cutting a circle in ferrous alloys, such as steel. The present invention does not require an operator to move while cutting a metal, thus ensures precise cutting of the metal in a smaller space.

Prior to this invention, the attachments for circular cutting required a larger space because the operator was required to move while cutting the metal. Movement of the operator during the operation of the oxy-fuel torch was prone to inaccuracies in cutting.

SUMMARY

An attachment to fit to a nozzle portion of an oxy-fuel torch that enables an operator to precisely cut a circle in a metal without having to move during operation is disclosed. The attachment includes a nut threadably attached to the nozzle portion that in turn holds a brass bushing that is concentrically and coaxially arranged inside a bearing within a bearing retainer. Further, a torch radius adjustment arm retainer is slidably locked to the bearing retainer via a dovetail joint and is configured to slidably receive a long arm of an L-shaped radius adjustment, further secured by a first thumb screw. The operator cuts the circle having a radius equal to distance between the nozzle portion and a replaceable radius pivot point threadably attached at end of a short arm of the radius adjustment arm by pivoting on said pivot point and rotating the torch in the circle.

BRIEF DESCRIPTION OF THE FIGURES

The detailed description of some embodiments of the invention is made below with reference to the accompanying figures, wherein like numerals represent corresponding parts of the figures.

FIG. 1 shows a perspective view of one embodiment of the present invention in use;

FIG. 2 shows a perspective view of one embodiment of the present invention;

FIG. 3 shows an exploded view of one embodiment of the present invention;

FIG. 4 shows a perspective view of one embodiment of the present invention in use;

FIG. 5 shows a perspective view of one embodiment of the present invention in use;

FIG. 6 shows a perspective view of one embodiment of the present invention in use;

FIG. 7 shows a perspective view of one embodiment of the present invention in use;

FIG. 8 shows a perspective view of one embodiment of the present invention in use;

DETAILED DESCRIPTION OF CERTAIN EMBODIMENTS

Figure 9:
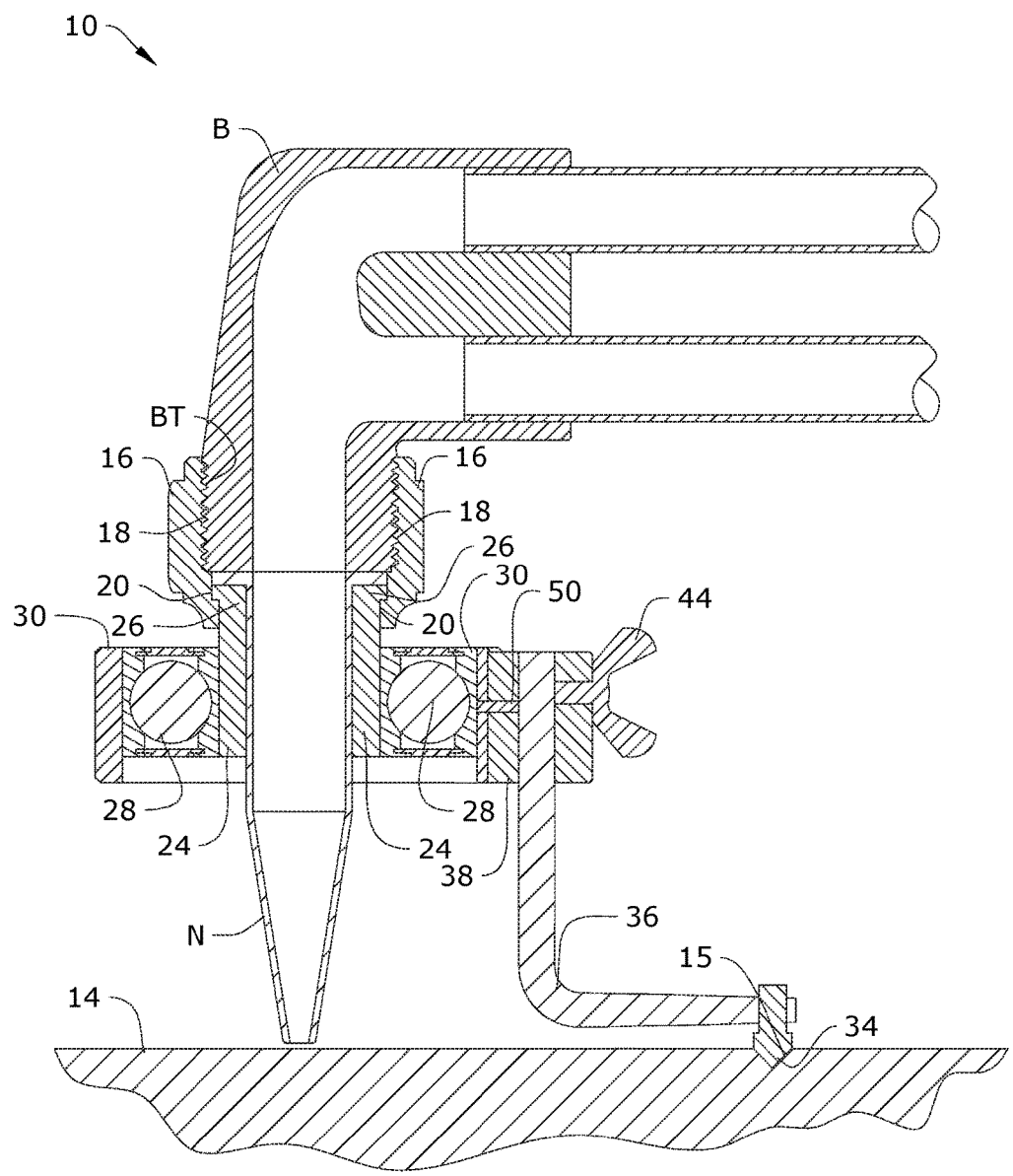
FIG. 9 shows a section view of one embodiment of the present invention taken along line 9-9 in FIG. 5.
Figure 10:
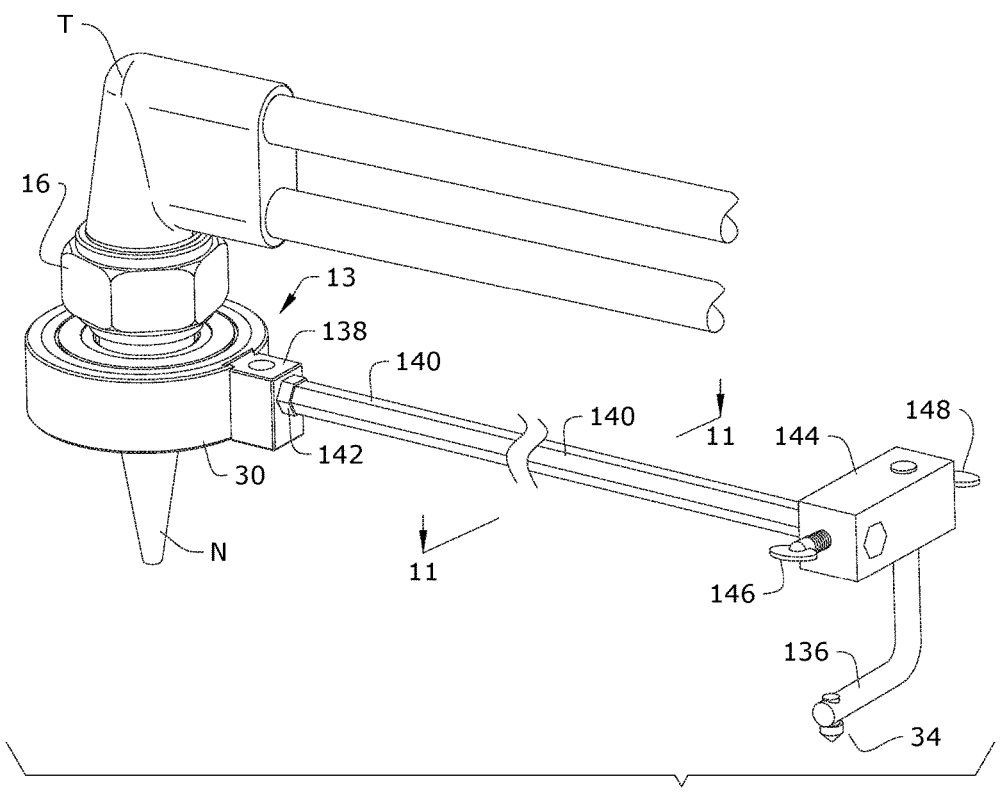
FIG. 10 shows a perspective view of an alternate embodiment of the present invention.
Figure 11:
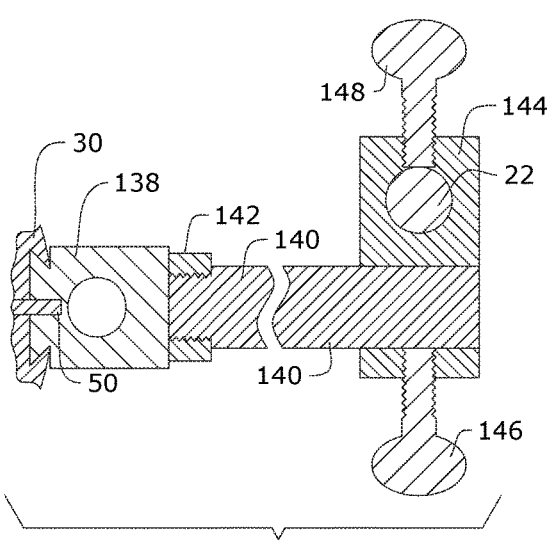
FIG. 11 shows a section detail view of one embodiment of the present invention taken along line 11-11 in FIG. 10
Figure 12:
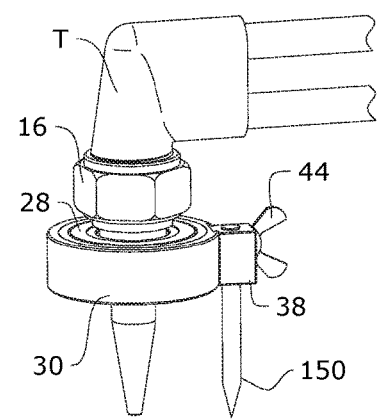
FIG. 12 shows a perspective detail view of a tertiary embodiment of the present invention.

By way of example, and referring to FIGS. 1-9, a circle cutting system 10 is configured to permit a torch T to cut a circle 12 through a material surface 14 having an indentation 16 therein. Torch T is shown with torch body B having body threads BT and torch nozzle N.

The circle cutting system 10 comprises a torch nut 16. The torch nut 16 further comprising a torch nut threaded center 18 joined to a torch nut seat 20. The torch nut threaded center 18 is adapted to mate with the body threads BT.

A bushing 22 further comprises a bushing sleeve 24 joined to a bushing flange 26. The busing flange 26 is immediately adjacent to the torch nut seat 20. A bearing 28 is press fit onto the bushing sleeve 24. A bearing retainer 30 is immediately adjacent to the bearing 28.

An attachment assembly 32 is connected to the bearing retainer 30 and further comprises a pivot point 34 adapted to fit into the indentation 16. A radius adjustment arm 36 can be attached to the pivot point 34. The attachment assembly 32 can further comprise an attachment assembly housing 38. The attachment assembly housing 38 further comprises a dovetail socket 40. The bearing retainer 30 further comprises a dovetail tail 42 wherein the dovetail tail 42 is mated to the dovetail socket 40. In some embodiments, an attachment assembly housing wingnut 44 can join the radius adjustment arm 36 to the attachment assembly housing 38.

The bearing retainer 30 further comprises a bearing retainer roll pin opening 46. The attachment assembly housing 38 further comprises an attachment assembly housing roll pin opening 48. A roll pin 50 can be inserted through the bearing retainer roll pin opening 46 and the attachment assembly housing roll pin opening 48.

In some embodiments, the attachment assembly 132 further comprises a radius arm extension 140 attached to the attachment assembly housing 138 with an extension nut 142. The attachment assembly 132 further comprises a block 144 attached to the radius arm extension 140 with a first thumb screw 146. The block 144 is attached to radius adjustment arm 136 with a second thumb screw 148. In some embodiments, the radius adjustment arm 150 is linear shaped. In other embodiments, the radius adjustment arm 136 is L-shaped.

To manufacture the attachment, machinery routinely used in the art are utilized such as milling machine. For example, to make the bearing retainer, a piece of 6061 aluminum tubing is held in place using a vise and shaped with a lathe to comprise the dovetail slot. Further the opening for the roll pin is drilled into the dovetail slot. Similarly, brass bushing with the flange and the cylindrical body is made from brass stock using the lathe and the nut is configured to receive the bushing flange. Next, the torch radius adjustment arm retainer, the radius adjustment arm, the replaceable radius pivot point, the radius arm extension and the straight arm radius point arm are manufactured from 304 stainless steel. The torch radius adjustment arm retainer is produced by using milling machine to slide into the dovetail slot, to have the opening for inserting the roll pin and to threadably receive the first thumb screw. The thumb screws and the extension nut are made of standard ¼"-20 stainless steel.

The components can be manufactured from other materials, such as carbon steel can be used instead of stainless steel, brass and aluminum.

Once the attachment is assembled, the operator makes depression on the metal using the replaceable radius pivot point followed by making the pilot hole, the operator pivots on said pivot point by rotating the torch in the circular torch path. The torch nozzle streams ignited stream of oxygen and fuel gas onto the metal surface that oxidizes and cuts the metal.

The attachment may be equipped with a wheel connected by an arm for cutting the circle with a larger diameter. Further, the nuts and the brass bushing can be configured to fit to different types of torches. Furthermore, the brass bushing can be configured to attach to outside of the nut, instead of fitting in the opening. Moreover, the bearing of different kind, such as unsealed and unlubricated may be used.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A circle cutting system, configured to permit a torch to cut a circle through a material surface having an indentation therein; the circle cutting system comprising:
    a torch nut, further comprising a torch nut threaded center joined to a torch nut seat; wherein the threaded center is adapted to mate with the torch;
    a bushing, further comprising a bushing sleeve joined to a bushing flange; wherein the busing flange is immediately adjacent to the torch nut seat;
    a bearing, press fit onto the bushing;
    a bearing retainer, immediately adjacent to the bearing;
    an attachment assembly, connected to the bearing retainer and further comprising a pivot point adapted to fit into the indentation; wherein the attachment assembly further comprises:
    a radius adjustment arm attached to the pivot point; and
    an attachment assembly housing wherein the attachment assembly housing further comprises a dovetail socket;
    wherein engaging the torch through the bushing enables a user to rotate the torch around the pivot point.

2. The circle cutting system of claim 1, wherein the bearing retainer further comprises a dovetail tail wherein the dovetail tail is mated to the dovetail socket.

3. The circle cutting system of claim 2, wherein the bearing retainer further comprises a bearing retainer roll pin opening, wherein the attachment assembly housing further comprises an attachment assembly housing roll pin opening.

4. The circle cutting system of claim 3 further comprising a roll pin inserted through the bearing retainer roll pin opening and the attachment assembly housing roll pin opening.

5. The circle cutting system of claim 4 wherein the attachment assembly further comprises a radius arm extension attached to the attachment assembly housing with an extension nut.

6. The circle cutting system of claim 5 wherein the attachment assembly further comprises a block attached to the radius arm extension with a pair of thumb screws.

7. A circle cutting system, configured to permit a torch to cut a circle through a material surface having an indentation therein; the circle cutting system comprising:
    a torch nut, further comprising a torch nut threaded center joined to a torch nut seat; wherein the threaded center is adapted to mate with the torch;
    a bushing, further comprising a bushing sleeve joined to a bushing flange; wherein the busing flange is immediately adjacent to the torch nut seat;
    a bearing, press fit onto the bushing;
    a bearing retainer, immediately adjacent to the bearing;
    an attachment assembly, connected to the bearing retainer and further comprising a pivot point adapted to fit into the indentation; wherein the attachment assembly further comprises:
    a radius adjustment arm attached to the pivot point; and
    the radius adjustment arm is L-shaped;
    wherein engaging the torch through the bushing enables a user to rotate the torch around the pivot point.

8. The circle cutting system of claim 7, wherein the bearing retainer further comprises a dovetail tail wherein the dovetail tail is mated to the dovetail socket.

9. The circle cutting system of claim 8, wherein the bearing retainer further comprises a bearing retainer roll pin opening, wherein the attachment assembly housing further comprises an attachment assembly housing roll pin opening.

10. The circle cutting system of claim 9 further comprising a roll pin inserted through the bearing retainer roll pin opening and the attachment assembly housing roll pin opening.

11. The circle cutting system of claim 10 wherein the attachment assembly further comprises a radius arm extension attached to the attachment assembly housing with an extension nut.

12. The circle cutting system of claim 11 wherein the attachment assembly further comprises a block attached to the radius arm extension with a pair of thumb screws.

* * * * *